United States Patent
Wei et al.

(10) Patent No.: US 11,428,835 B2
(45) Date of Patent: Aug. 30, 2022

(54) FACILITATING HYDROCARBON EXPLORATION AND EXTRACTION BY APPLYING A MACHINE-LEARNING MODEL TO SEISMIC DATA

(71) Applicant: LANDMARK GRAPHICS CORPORATION, Houston, TX (US)

(72) Inventors: Zhili Wei, Pearland, TX (US); Meng Meng, Tulsa, OK (US); Fan Jiang, Sugar Land, TX (US); Youli Mao, Houston, TX (US); Phil Norlund, Spring, TX (US)

(73) Assignee: Landmark Graphics Corporation, Houston, TX (US)

( * ) Notice: Subject to any disclaimer, the term of this patent is extended or adjusted under 35 U.S.C. 154(b) by 47 days.

(21) Appl. No.: 16/827,532

(22) Filed: Mar. 23, 2020

(65) Prior Publication Data
US 2021/0293983 A1 Sep. 23, 2021

(51) Int. Cl.
*G01V 1/28* (2006.01)
*G01V 1/36* (2006.01)
(Continued)

(52) U.S. Cl.
CPC .............. *G01V 1/282* (2013.01); *G01V 1/301* (2013.01); *G01V 1/345* (2013.01); *G01V 1/364* (2013.01); *G06N 5/04* (2013.01); *G06N 20/00* (2019.01)

(58) Field of Classification Search
CPC ........ G01V 1/282; G01V 1/301; G01V 1/345; G01V 1/364; G06N 20/00; G06N 5/04
See application file for complete search history.

(56) References Cited

U.S. PATENT DOCUMENTS

| 8,170,288 B2 * | 5/2012 | Wang ..................... G01V 1/364 |
| | | 382/109 |
| 2005/0043891 A1 | 2/2005 | Bush |

(Continued)

FOREIGN PATENT DOCUMENTS

| WO | 2018072815 | 4/2018 |
| WO | 2020009850 | 1/2020 |
| WO | 2020231379 | 11/2020 |

OTHER PUBLICATIONS

Di, et al., "Multi-Attribute K-Means Clustering for Salt-Boundary Delineation From Three-Dimensional Seismic Data", Geophysical Journal International, vol. 215, No. 3, Sep. 14, 2018, pp. 1997-2000.
He, et al., "Mask R-CNN", In Proceedings of the IEEE International Conference on Computer Vision, Jan. 24, 2018, 12 pages.
Ronneberger, et al., "U-Net: Convolutional Networks For Biomedical Image Segmentation", Lecture Notes in Computer Science, vol. 9351, May 18, 2015, 8 pages.

(Continued)

*Primary Examiner* — Alexander Satanovsky
*Assistant Examiner* — Lynda Dinh
(74) *Attorney, Agent, or Firm* — Kilpatrick Townsend & Stockton LLP (57) ABSTRACT

Hydrocarbon exploration and extraction can be facilitated using machine-learning models. For example, a system described herein can receive seismic data indicating locations of geological bodies in a target area of a subterranean formation. The system can provide the seismic data as input to a trained machine-learning model for determining whether the target area of the subterranean formation includes one or more types of geological bodies. The system can receive an output from the trained machine-learning model indicating whether or not the target area of the subterranean formation includes the one or more types of geological bodies. The system can then execute one or more processing operations for facilitating hydrocarbon exploration or extraction based on the seismic data and the output from the trained machine-learning model.

20 Claims, 7 Drawing Sheets

(51) Int. Cl.
*G01V 1/30* (2006.01)
*G01V 1/34* (2006.01)
*G06N 20/00* (2019.01)
*G06N 5/04* (2006.01)

(56) References Cited

U.S. PATENT DOCUMENTS

| | | | |
|---|---|---|---|
| 2016/0170065 A1 | 6/2016 | Jain et al. | |
| 2019/0025461 A1 | 1/2019 | Wiener et al. | |
| 2019/0292908 A1* | 9/2019 | Karimi Vajargah | G06F 17/18 |
| 2019/0370690 A1* | 12/2019 | Anderson | G06N 20/10 |
| 2019/0383965 A1 | 12/2019 | Salman et al. | |
| 2020/0088897 A1 | 3/2020 | Roy et al. | |
| 2020/0150305 A1* | 5/2020 | Guevara Diaz | G01V 1/306 |
| 2020/0183047 A1* | 6/2020 | Denli | G01V 1/303 |
| 2020/0184374 A1* | 6/2020 | Liu | G06F 16/2246 |

OTHER PUBLICATIONS

Shi, et al., "Automatic Salt-Body Classification Using a Deep Convolutional Neural Network", SEG International Exposition and 88th Annual Meeting, 2018, pp. 1971-1975.
Wrona, et al., "Seismic Facies Analysis Using Machine Learning", Geophysics, vol. 83, No. 5, Sep.-Oct. 2018, pp. 083-095.
Wu, "Methods to Compute Salt Likelihoods and Extract Salt Boundaries From 3D Seismic Images", Cgeophysics, vol. 81, No. 6, Nov.-Dec. 2016, pp. IM119-IM126.
Application No. PCT/US2020/024313, International Search Report and Written Opinion, dated Dec. 8, 2020.
GB Application No. GB2016734.2, "Search Report", dated Mar. 17, 2021, 4 pages.

\* cited by examiner

FACILITATING HYDROCARBON EXPLORATION AND EXTRACTION BY APPLYING A MACHINE-LEARNING MODEL TO SEISMIC DATA

TECHNICAL FIELD

The present disclosure relates generally to hydrocarbon exploration and extraction. More specifically, but not by way of limitation, this disclosure relates to facilitating hydrocarbon exploration or extraction by applying a machine-learning model to seismic data.

BACKGROUND

Hydrocarbon exploration is the search for hydrocarbons (e.g., oil or gas) within a subterranean formation. The search for hydrocarbons relies heavily on the chemical and physical properties of subterranean formations. Well operators can use a variety of tools to measure the chemical and physical properties of the subterranean formation. These measurements can then be interpreted to determine if a subterranean formation has hydrocarbons. The measurements can also be interpreted to determine if a subterranean formation is stable enough to sustain hydrocarbon-extraction operations, such as drilling, completion, and production. Incorrect interpretation of such measurements can result in poor hydrocarbon production and, in some cases, catastrophic wellbore failures.

DETAILED DESCRIPTION

Certain aspects and features of the present disclosure relate to facilitating hydrocarbon exploration or extraction by applying a machine-learning model to seismic data. Seismic data is multidimensional data generated using principles of seismology that indicates the physical properties of a subsurface formation. As one particular example, a machine-learning model can receive input including seismic data characterizing a target area of a subterranean formation. In response to receiving the seismic data, the machine-learning model can generate an output indicating what types of geological bodes are present in the target area. A geological body is a geological substance other than rock that is present in a subterranean formation. Exemplary types of geological bodies can include sand bodies, salt bodies, water bodies, gas bodies, and oil bodies. The output of the machine-learning model can be used to determine whether the target area contains hydrocarbons and is stable enough to sustain hydrocarbon-extraction operations.

The machine-learning model can be trained using a training dataset. The training dataset can include seismic datasets collected from various geographical regions for subterranean formations made of different rock types and geological bodies. Each of the seismic datasets can be assigned one or more labels in the training dataset indicating the type or types of geological bodies that are reflected in the seismic datasets. A supervised training method can be applied to train the machine-learning model based on the training dataset.

In some examples, a computing device can execute (e.g., automatically execute) one or more processing operations based on the output of the machine-learning model. For example, the computing device can determine that a target type of geological body is present in a target area of a subterranean formation based on the output from the machine-learning model. An example of the target type of geological body can be a salt body. The computing device can then apply an image-analysis algorithm to the input seismic data to determine an outer boundary of the target type of geological body in the seismic data. Examples of the image-analysis algorithm can include a smoothing algorithm, an edge-detection algorithm, a segmentation algorithm, or any combination of these. After determining the outer boundary, the computing device can generate a graphical user interface (GUI) that highlights the outer boundary relative to a remainder of the seismic data. For example, the computing device can generate a GUI that overlays an outline of the outer boundary on top of the seismic data. As another example, the computing device can generate a GUI in which seismic content external to the outer boundary is removed from the seismic data. Highlighting the outer boundary can assist the well planner in understanding the seismic data to facilitate wellbore planning and hydrocarbon extraction.

Additionally or alternatively, the one or more processing operations can involve generating a three-dimensional (3D) simulation based on the input seismic data and the output from the machine-learning model. The computing device can execute the 3D simulation to determine simulated properties of the target area of the subterranean formation. The computing device can then provide the simulated properties to the well planner, for example, as part of a GUI. The simulated properties can assist the well planner with anticipating potential problems in performing hydrocarbon-extraction operations in the target area, so that the problems can be avoided or mitigated.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
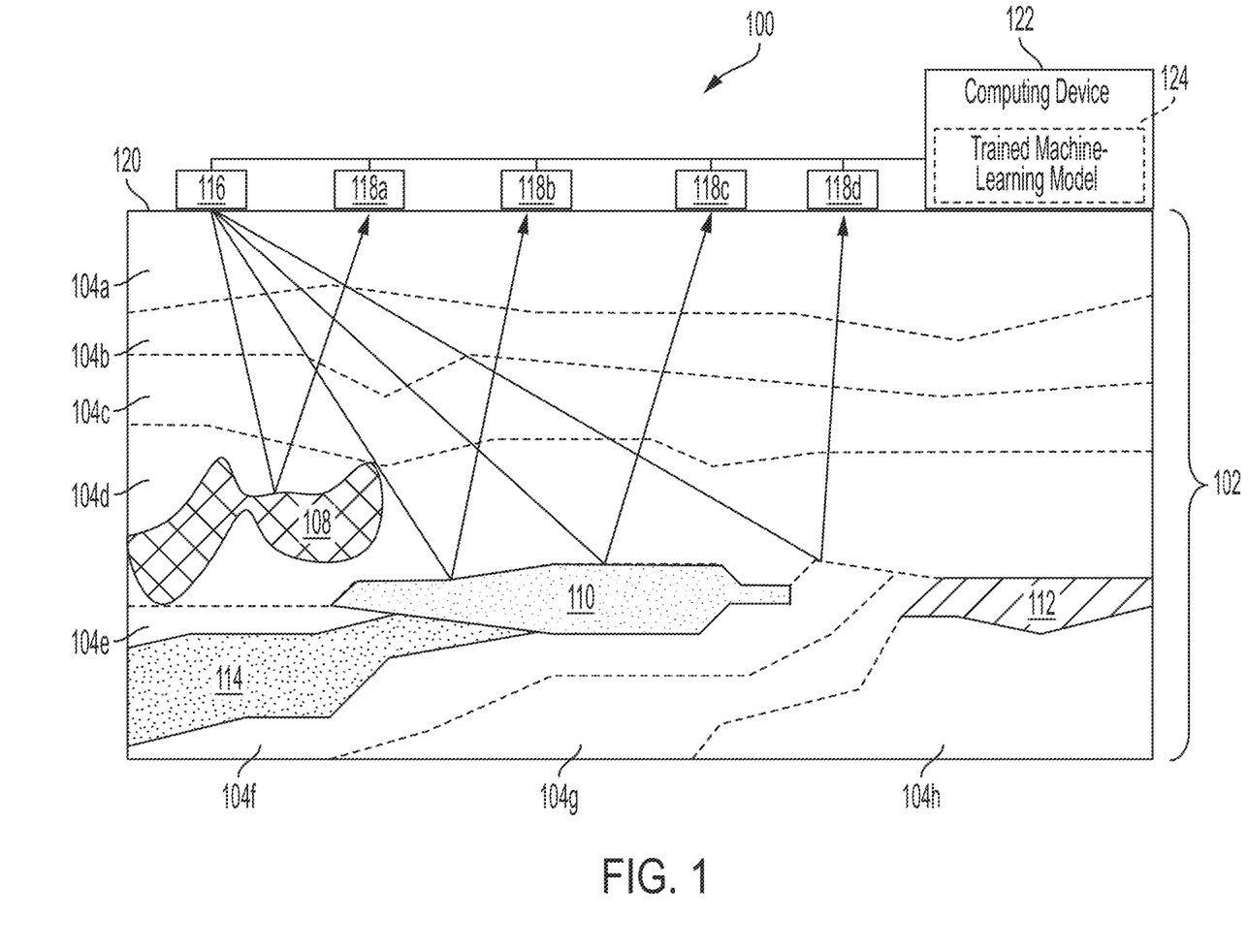
FIG. 1 depicts an example of an environment including a system for facilitating hydrocarbon exploration and extraction according to some aspects of the present disclosure.

FIG. 1 is an example of an environment 100 that includes a system for facilitating hydrocarbon exploration and extraction according to some aspects of the present disclosure. The environment 100 includes a subterranean formation 102 formed from various earth strata 104a-h. The subterranean formation 102 includes various geological bodies, such as a salt body 108 containing salt, an oil body 110 containing oil, a gas body 112 containing gas, and a water body 114 containing water. Other examples may include more, fewer, or different types of earth strata and geological bodies.

At least a portion of the system can be positioned at the surface 120 of the subterranean formation 102 for detecting geological bodies in the subterranean formation 102. For example, the system can include a signal source 116 and sensors 118a-d. Examples of the signal source 116 can include a vibration unit or an explosive charge, and examples of the sensors 118a-d can include geophones or hydrophones. The signal source 116 can emit one or more waves into a target area of the subterranean formation 102. In the example shown in FIG. 1, the waves are represented by black arrows and the target area is the portion of the subterranean formation 102 positioned below sensors 118a-d. The waves can reflect off the geological bodies and return to the sensors 118a-d, which can detect the reflected waves and provide corresponding sensor data to a computing device 122, which may also form part of the system.

As one particular example, the signal source 116 can include a vibration unit and the sensors 118a-d can include geophones. The vibration unit can emit vibrations that propagate through the target area of the subterranean formation 102, reflect off the geological bodies, and return to the geophones. The geophones can receive the reflected vibrations and generate seismic data based on the reflected vibrations. An example of the seismic data can be a seismic trace. The geophones can then transmit their respective seismic data to the computing device 122.

The computing device 122 includes a trained machine-learning model 124 that can receive seismic data as input and provide an output indicating which types of geological bodies are present in the target area of the subterranean formation 102. For example, the computing device 122 can execute the trained machine-learning model 124 based on the seismic data to generate an output indicating whether or not the target area includes a salt body 108, an oil body 110, a gas body 112, a water body 114, a volcanic intrusion, a certain type of rock layer, or any combination of these. This can provide useful information to a well operator as to whether the target area is suitable for hydrocarbon extraction. For example, the presence of the salt body 108 may make the target area unstable and therefore poorly suited to drilling operations. Notifying the well operator of this information before he initiates drilling, completion, or extraction operations can minimize the likelihood of costly and dangerous events, such as casing fracturing and wellbore collapse.

While FIG. 1 depicts an exemplary system that includes certain components (e.g., the signal source 116, sensors 118a-d, and computing device 122), this is intended to be illustrative and non-limiting. Other examples may include more, fewer, or different components. For instance, another example may involve the computing device 122 receiving seismic data from a remote computing device via a network, such as the Internet. The computing device 122 can receive the seismic data from the remote computing device additionally or alternatively to receiving seismic data from the sensors 118a-d. And in some examples, the computing device 122 may be positioned offsite, rather than proximately to the target area of the subterranean formation 102.

Figure 2:
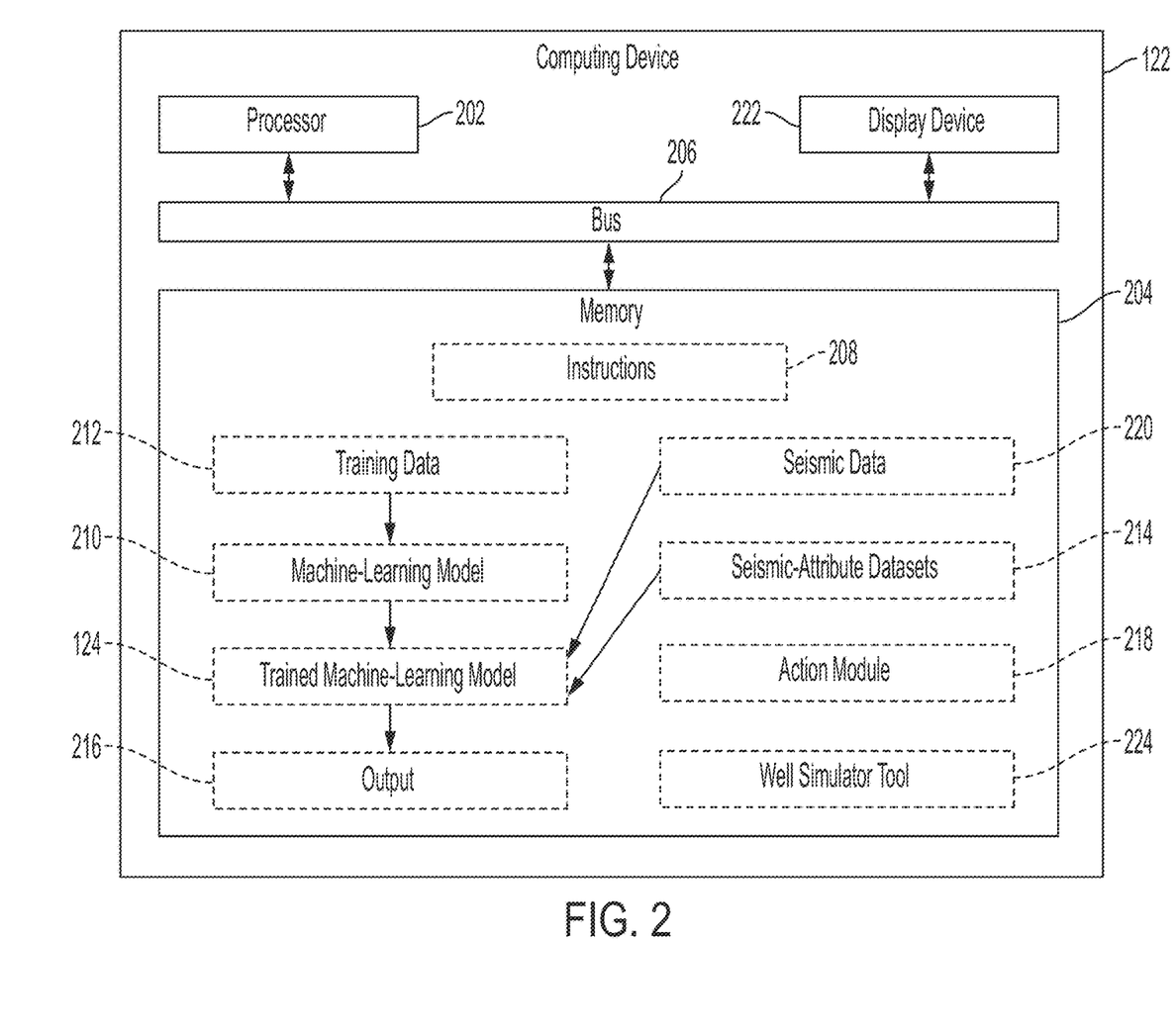
FIG. 2 depicts a block diagram of an example of a computing device according to some aspects of the present disclosure.

FIG. 2 is a block diagram of an example of the computing device 122 according to some aspects of the present disclosure. While FIG. 2 depicts the computing device 122 as including certain components, other examples may involve more, fewer, or different components than are shown in FIG. 2.

As shown, the computing device 122 includes a processor 202 communicatively coupled to a memory 204 by a bus 206. The processor 202 can include one processor or multiple processors. Non-limiting examples of the processor 202 include a Field-Programmable Gate Array (FPGA), an application-specific integrated circuit (ASIC), a microprocessor, or any combination of these. The processor 202 can execute instructions 208 stored in the memory 204 to perform operations. In some examples, the instructions 208 can include processor-specific instructions generated by a compiler or an interpreter from code written in any suitable computer-programming language, such as C, C++, C #, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium from which the processor 202 can read instructions 208. A non-transitory computer-readable medium can include electronic, optical, magnetic, or other storage devices capable of providing the processor 202 with the instructions 208 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 208.

Additionally, the computing device 122 can include training data 212 for training a machine-learning model 210. The training data 212 can include multiple input-output pairs. Each input-output pair includes, as input, a seismic dataset characterizing a subterranean formation area. A subterranean formation area is a designated area of a subterranean formation. Each input-output pair also includes, as output, one or more output labels specifying one or more types of geological bodies present in that subterranean formation area. For example, an input-output pair can include an input seismic trace corresponding to a subterranean formation area and one or more output labels indicating that the subterranean formation area includes a salt body and a gas body. The output labels may have been manually assigned to the input seismic dataset by a geologist or other expert. The training data 212 can include any number and combination of input-output pairs corresponding to any number and combination of subterranean formation areas, though more input-output pairs may produce better training results.

In some examples, the machine-learning model 210 can include a neural network, a support vector machine, a Bayesian classifier, or any combination of these. The machine-learning model 210 may be in an untrained state. The machine-learning model 210 can be trained using the training data 212 to generate a trained machine-learning model 124.

Once trained, the machine-learning model 124 can be configured to receive seismic data 220 corresponding to a target area of a subterranean formation as input and responsively generate an output 216 indicating one or more types of geological bodies that are present in the target area. A target area of a subterranean formation is a designated area of subterranean formation to be analyzed, for example, to determine whether the area contains one or more types of geological bodies. The seismic data 220 can be different than the training data 212, such that the seismic data 220 was not used to train the machine-learning model 210. In this way, the seismic data 220 can be "unknown" to the trained machine-learning model 124.

Figure 5:
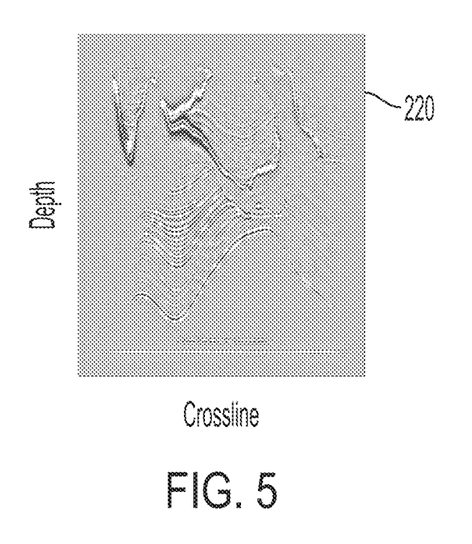
FIG. 5 depicts an example of seismic data according to some aspects of the present disclosure.

The seismic data 220 is multidimensional data, such as two-dimensional (2D) data or three-dimensional (3D) data. For example, the seismic data 220 can include data points having multiple dimensions, such as amplitude, depth, and time. The data points can have the raw data values as originally provided by the sensors, or the data points can have derived values generated by pre-processing the raw data values. An example of the seismic data 220 is depicted in FIG. 5. In FIG. 5, the X-axis represents crossline number (e.g., in kilometers) and the Y-axis represents depth. A crossline is a seismic line within a 3D survey that is perpendicular to the direction in which the data was acquired.

In some examples, the computing device 122 can also determine one or more seismic-attribute datasets 214 based on the seismic data 220. A seismic-attribute dataset is a multidimensional dataset including values for a particular type of seismic attribute, such as a relative acoustic impedance, apparent polarity, reflection strength, root mean squared (RMS) frequency, or an arc length. The computing device 122 can determine the seismic-attribute datasets 214 prior to providing the seismic data 220 as input to the trained machine-learning model 124, and then provide the seismic-attribute datasets 214 as input to the trained machine-learning model 124 in addition to the seismic data 220. The seismic-attribute datasets 214 can assist the trained machine-learning model 124 in determining which types of geological bodies are present in the target area of the subterranean formation. For example, the seismic-attribute datasets 214 can serve as additional contextual information that can improve the accuracy of the output 216 from the trained machine-learning model 124.

The computing device 122 can also include an action module 218. The action module 218 can include executable program code for taking one or more actions based on the output 216 of the trained machine-learning model 124. For example, the computing device 122 can execute the action module 218 to determine whether the target area of the subterranean formation is suitable for drilling a wellbore based on the output 216 from the trained machine-learning model 124. The computing device 122 can then generate a graphical user interface (GUI) indicating whether the target area is suitable for drilling and display the GUI on a display device 222, such as a liquid crystal display or light emitting diode display.

As one particular example, the computing device 122 use the trained machine-learning model 124 to generate an output 216 indicating that a target area of the subterranean formation associated with the seismic data 220 includes a particular type of geological body, such as a water body or salt body. The computing device 122 can then execute the action module 218 to apply a set of rules based on the output 216 to determine whether the target area is suitable for drilling. The rules may indicate that a presence of the particular type of geological body renders the target area unsuitable for drilling. So, the computing device 122 can generate and display a GUI that includes an alert indicating that the target area is unsuitable for drilling. As an alternative example, the computing device 122 use the trained machine-learning model 124 to generate an output 216 indicating that a target area of the subterranean formation associated with the seismic data 220 includes a first type of geological body, such as a gas body, and lacks a second type of geological body, such as a water body or salt body. The computing device 122 can then execute the action module 218 to apply the set of rules based on the output 216 to determine whether the target area is suitable for drilling. The rules may indicate that a presence of the first body and the absence of the second body renders the target area of the subterranean formation suitable for drilling. So, the computing device 122 can generate and display a GUI that includes a notification indicating that the target area is suitable for drilling.

As another example, the computing device 122 use the trained machine-learning model 124 to determine that a target area of the subterranean formation associated with the seismic data 220 includes particular type of geological body, such as a water body or salt body. The computing device 122 can then execute the action module 218 to convey the seismic data 220, the output 216, or both of these to a well simulator tool 224, such as DecisionSpace® 365 by Halliburton Company. The well simulator tool 224 can receive the seismic data 220 and the output 216 and responsively generate a three-dimensional (3D) simulation of the target area of the subterranean formation. The output 216 can provide context to the simulation that improves the accuracy of the 3D simulation. For example, the well simulator tool 224 may be unable to unilaterally determine whether the target area of the subterranean formation includes certain types of geological bodies, but that information may be useful for generating an accurate simulation. Thus, by providing the output 216 to the well simulator tool 224, the well simulator tool 224 can produce more accurate simulation results. After generating the 3D simulation, the well simulator tool 224 can execute the 3D simulation to determine simulated properties of the target area of the subterranean formation. The well simulator tool 224 can then provide the simulated properties to a well planner, who can use the simulated properties in one or more hydrocarbon exploration or extraction processes.

Figure 3:
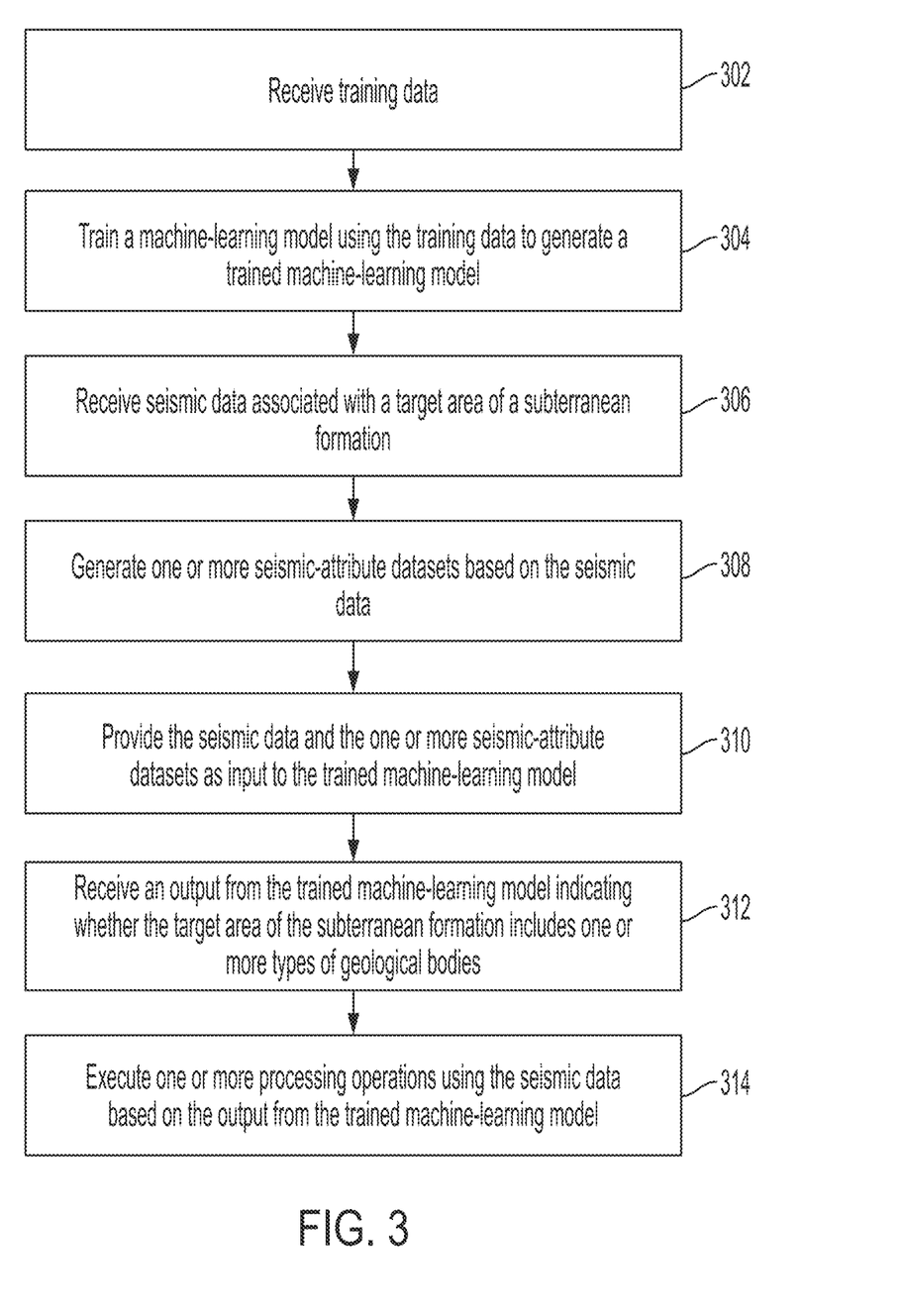
FIG. 3 depicts a flow chart of an example of a process according to some aspects of the present disclosure.

In some examples, the computing device 122 can implement the process shown in FIG. 3 for effectuating some aspects of the present disclosure. Other examples can involve more operations, fewer operations, different operations, or a different order of the operations shown in FIG. 3. The operations of FIG. 3 are described below with reference to the components shown in FIG. 2.

In block 302, a processor 202 receives training data 212. The training data 212 can include a plurality of seismic datasets and their corresponding output labels. For example, the training data 212 can include a plurality of seismic datasets and corresponding indicators of which of type(s) of geological bodies are present in each seismic dataset among the plurality of seismic datasets.

In block 304, the processor 202 trains a machine-learning model 210 using the training data 212 to generate a trained machine-learning model 124. The processor 202 can train the machine-learning model 210 using a supervised training approach, through which the machine-learning model 210 can learn patterns within the training data 212 (e.g., patterns between the input seismic datasets and the output labels). The processor 202 can train the machine-learning model 210 by iteratively tuning weights internal to the machine-learning model 210 based on the training data 212.

Figure 4:
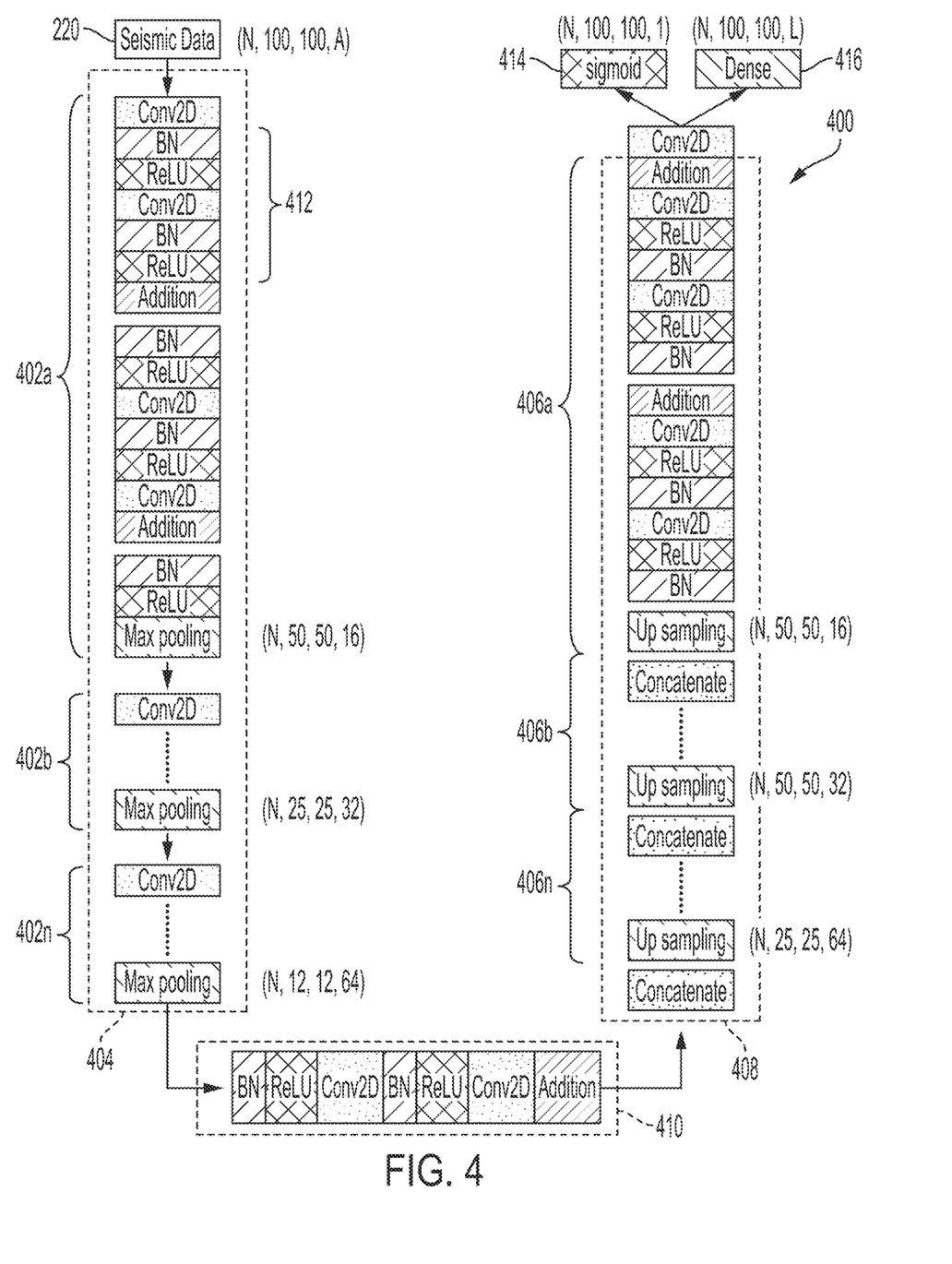
FIG. 4 depicts an example of a machine-learning model according to some aspects of the present disclosure.

One example of a machine-learning model 400 (e.g., the trained machine-learning model 124) suitable for implementing some aspects of the present disclosure is shown in FIG. 4. The machine-learning model 400 can include a plurality of encoding layer groups 402a-n that collectively form an encoding portion 404 of the machine-learning model 400. Each of the encoding layer groups 402a-n can include the layers shown in FIG. 4, as arranged in the order shown in FIG. 4. Though, other combinations and arrangements of layers are possible and contemplated within the scope of this disclosure. The output from each layer feeds into the next layer. In other words, the output of each layer serves as an input for the next layer.

As shown in FIG. 4, the encoding layer groups 402a-n can include two-dimensional convolutional layers (Conv2D). A Conv2D layer performs two-dimensional convolution on its input to extract patterns or features from the input. The encoding layer groups 402a-n may also include batch normalization (BN) layers. A BN layer normalizes its input in batches. BN layers can improve the speed, performance, and stability of the machine-learning model 400. The encoding layer groups 402a-n may also include rectified linear unit (ReLU) layers. A ReLU layer is an activation layer that applies a rectifier to its input. ReLU layers can be trained faster using backpropagation than other types of activation layers.

In some examples, the encoding layer groups 402a-n can also include addition layers (Addition). An Addition layer sums together a first coefficient of a Conv2D layer with a second coefficient of multiple layers 412 in an encoding layer group 402a. These coefficients can be tuned during the training process for the machine-learning model 400. In the example shown in FIG. 4, the multiple layers of the encoding layer group 402a include a BN layer, a ReLU layer, a Conv2D layer, and another ReLU layer. But other examples can involve more, fewer, or different layers. The Addition layer can assist with avoiding a vanishing gradient problem in which the gradient of the machine-learning model 400 diminishes to approximately zero (vanishing). Such a vanishing gradient can prevent the machine-learning model 400 from further learning and reduce the accuracy of the machine-learning model 400. Thus, avoiding the vanishing gradient can improve the accuracy of the machine-learning model 400.

The encoding layer groups 402a-n may also include max pooling layers (Max pooling). A max pooling layer can downsample its input to reduce the size of the input. For example, a max pooling layer can reduce a 100×100 matrix of values to a 50×50 matrix of values. This downsampling can reduce the total number of computations performed by the machine-learning model 400 and increase efficiency.

A plurality of decoding layer groups 406a-n can also be included in the machine-learning model 400. The plurality of decoding layer groups 406a-n can collectively form a decoding portion 408 of the machine-learning model 400. Each of the decoding layer groups 406a-n can include the layers shown in FIG. 4, as arranged in the order shown in FIG. 4. Though, other combinations and arrangements of layers are possible and contemplated within the scope of this disclosure. The output from each layer feeds into the next layer. In other words, the output of each layer serves as an input for the next layer.

The decoding layer groups 406a-n can include Conv2D layers, BN layers, ReLU layers, Addition layers, upsampling layers (Upsampling), concatenation layers (Concatenate), or any combination of these. The Conv2D layers, BN layers, ReLU layers, and Addition layers can function similarly to those described above. An upsampling layer can generally perform the opposite functionality to the maxpooling layers and increase the size of an input. For example, the upsampling layer can upsample its input from a 50×50 matrix of values to a 100×100 matrix of values. A concatenation layer can perform an assembly process that ensures that the output size of a related upsampling layer matches the output size of a maxpooling layer corresponding to the upsampling layer. For example, the concatenation layer in decoding layer group 406b can ensure that the output size (50×50) of the upsampling layer in that decoding layer group 406b matches the maxpooling output size from the encoding layer group 402a. And the concatenation layer in decoding layer group 406n can ensure that the output size (25×25) of the upsampling layer in that decoding layer group 406n matches the maxpooling output size from the encoding layer 402b. And so on.

A bridge portion 410 can connect the encoding portion 404 to the decoding portion 408. In the example shown in FIG. 4, the bridge portion 410 includes BN layers, ReLU layers, Conv2D layers, and an addition layer. But other examples may involve more layers, fewer layers, different layers, or a different arrangement of layers than is shown.

In some examples, the machine-learning model 400 can further include (e.g., terminate with) a sigmoid layer 414. The sigmoid layer 414 can provide a numerical value between zero and one indicating a likelihood that a target area of a subterranean formation associated with the input seismic data 220 has a particular type of geological body. For example, the sigmoid layer 414 can output a numerical value of 0.78 if the machine-learning model determines that there is a 78% probability that the target area has a salt body. As another example, the sigmoid layer 414 can output a numerical value of 0.32 if the machine-learning model determines that there is a 32% probability that the target area has a salt body.

The machine-learning model 400 can additionally or alternatively include a dense layer 416. The dense layer 416 can provide one or more identifiers (e.g., labels or integer values) indicating one or more types of geological bodies that are present in the target area of the subterranean formation. For example, the dense layer can output 1 for a salt body, 2 for a water body, 3 for a gas body, 4 for an oil body, or any combination of these. But other numerical schemes are possible.

To assist with understanding the machine-learning model 400, FIG. 4 depicts information in the format (N, X, Y, A) next to each of the encoding layer groups 402a-n and decoding layer groups 406a-n. N is the number of samples in the input seismic data 220, where N is in a matrix format; X is the number of rows in the matrix; Y is the number of columns in the matrix; and A is the number of channels associated with that layer group. For example, A can be the number of seismic attributes (e.g., apparent polarity, arc length, and relative amplitude change) derived from the input seismic data 220 that can be analyzed by the layer group. The machine-learning model 400 can accept any number and combination of channels. FIG. 4 also depicts information in the format (N, X, Y, L) next to the sigmoid layer 414 and the dense layer 416. N, X, and Y are the same as above, while L is the number of outputs produced by the layer. Since the sigmoid layer 414 produces a single output value, the sigmoid layer 414 has an L value of 1. And since the dense layer 416 can provide L output labels, the dense layer 416 has a value of L.

The machine-learning model architecture shown in FIG. 4 is exemplary and intended to be non-limiting. In other examples, the machine-learning model 400 may have more layers, fewer layers, different layers, or a different arrangement of layers than is shown in FIG. 4. For instance, other examples may lack the BN layers, Addition layers, concatenate layers, or any combination of these. The values for N, X, Y, A, and L are also exemplary and intended to be non-limiting. Other examples may have different values for N, X, Y, A, and L than is shown in FIG. 4.

Returning to FIG. 3, after the machine-learning model 124 is trained, the process can continue to block 306. At block 306, the processor 202 receives seismic data 220 associated with a target area of a subterranean formation. The seismic data 220 can be generated using one or more sensors, such as one or more geophones or hydrophones, positioned proximate to the target area of the subterranean formation.

The seismic data 220 can be provided in any suitable format, such as a SEG-Y file format. The SEG-Y format is a standard format developed by the Society of Exploration Geophysicists (SEG) for storing geophysical data. The trained machine-learning model 124 can be configured to accept and process data in a particular file format, such as SEG-Y, to produce an output 216.

In block 308, the processor 202 generates one or more seismic-attribute datasets 214 based on the seismic data 220, where the one or more seismic-attribute datasets 214 correspond to one or more types of seismic attributes. The processor 202 can apply one or more algorithms to the seismic data 220 to generate the seismic-attribute datasets 214.

One exemplary type of seismic attribute is apparent polarity. Apparent polarity can be the polarity of seismic data scaled by the reflection strength, which roughly approximates scaled reflection coefficients. Apparent polarity can be a wavelet-response attribute, like response phase and response frequency. In an interval of seismic data 220 that is bound by consecutive envelope troughs (e.g., reflection strength minima), the apparent polarity can be the sign of the seismic data 220 measured at the envelope peak multiplied by the value of the envelope peak, and held constant in the interval.

Another exemplary type of seismic attribute is arc length. Arc length can be the length of the seismic waveform in a window measured along its curves divided by the length of the window. Arc length increases with both amplitude and frequency. Thus, a higher arc length may indicate strongly reflecting and moderately spaced bedding, or moderately reflecting and thinly spaced bedding. However, arc length tends to be driven more by amplitude than by frequency, so that it resembles RMS amplitude and other amplitude attributes.

Yet another exemplary type of seismic attribute is relative amplitude change. Relative amplitude change can be a directional attribute and appears illuminated along the time axis when displayed in monochrome. Relative amplitude change may reveal structural detail hidden in the amplitudes and highlights zones of reflection interference, which occur at amplitude minima between reflections. Relative amplitude change may blend particularly well with response phase and response frequency, because these attributes have a blocky output that changes values at amplitude minima.

Figure 6:
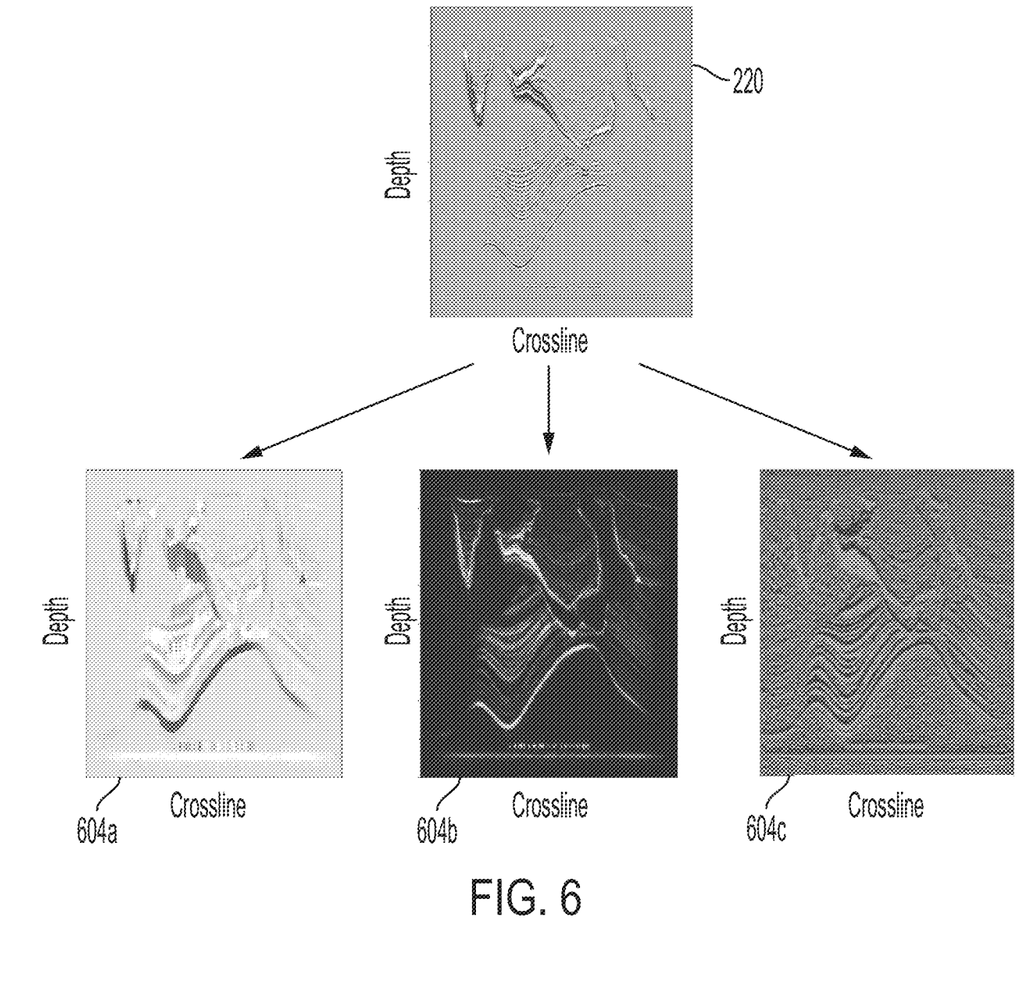
FIG. 6 depicts examples of seismic-attribute datasets according to some aspects of the present disclosure.

Some examples of seismic-attribute datasets 604a-c are shown in FIG. 6. In FIG. 6, the X-axes represent crossline number and the Y-axes represent depth. Seismic-attribute dataset 604a can indicate apparent polarities associated with the target area of the subterranean formation, seismic-attribute dataset 604b can indicate arc lengths associated with the target area, and seismic-attribute dataset 604c can indicate relative amplitude changes associated with the target area. But more or different seismic-attribute datasets corresponding to more or different types of seismic attributes can be generated.

Each data point in a seismic-attribute dataset can be generated by applying an algorithm to the value(s) of a related data point in the seismic data 220, such that each data point in the seismic-attribute dataset is related to a corresponding data point in the seismic data 220. This can result in the seismic-attribute datasets having the same dimensions as the input seismic data 220, in some examples. But in other examples, the seismic-attribute datasets can have different dimensions than the input seismic data 220.

In block 310, the processor 202 provides the seismic data 220, the one or more seismic-attribute datasets 214, or both of these as input to the trained machine-learning model 124.

In block 312, the processor 202 receives an output 216 from the trained machine-learning model 124. The output 216 can indicate whether the target area of the subterranean formation includes one or more types of geological bodies. For example, the output 216 can be a single numerical value from the sigmoid layer 414 of the machine-learning model 400 of FIG. 4, where the single numerical value indicates a probability of the target area including a target type of geological body. Additionally or alternatively, the output 216 can be one or more identifiers (e.g., integer values) from the dense layer 416 of the machine-learning model 400 of FIG. 4, where the identifiers indicate one or more types of geological bodies are present in the target area of the subterranean formation.

In block 314, the processor 202 executes one or more processing operations using the seismic data 220 based on the output 216 from the trained machine-learning model 124. In some examples, the processor 202 can execute the action module 218 to implement the one or more processing operations. For example, the action module 218 may include program code that is executable by the processor 202 for causing the processor 20 to implement the one or more processing operations.

In some examples, the one or more processing operations can involve smoothing an outer boundary of a target type of geological body in the seismic data 220. The processor 202 can smooth the outer boundary by applying a smoothing filter, such as a median filter, to the seismic data 220. One example of such smoothing is depicted in boxes 702a-b of FIG. 7. Box 702a depicts an outer boundary of a salt body prior to smoothing. Box 702b depicts the outer boundary of the salt body subsequent to smoothing. Smoothing the outer boundary can make the seismic data 220 easier to read and more conducive to further processing.

Additionally or alternatively, the one or more processing operations can involve identifying a boundary of a target type of geological body in the seismic data 220. In one such example, the processor 202 can determine that the target type of geological body (e.g., a salt body) is present in the target area of the subterranean formation based on the output 216 from the trained machine-learning model. The processor 202 can then execute one or more image-analysis algorithms on the seismic data 220 to determine an outer boundary of the target type of geological body. Examples of the image-analysis algorithms can include a smoothing algorithm, an edge-detection algorithm, a segmentation algorithm, or any combination of these. The processor 202 may then highlight the outer boundary to assist a user in visualizing the outer boundary. For instance, the processor 202 can generate a GUI that highlights the outer boundary within the seismic data 220. The processor 202 can then display the GUI on a display device 222.

Figure 7:
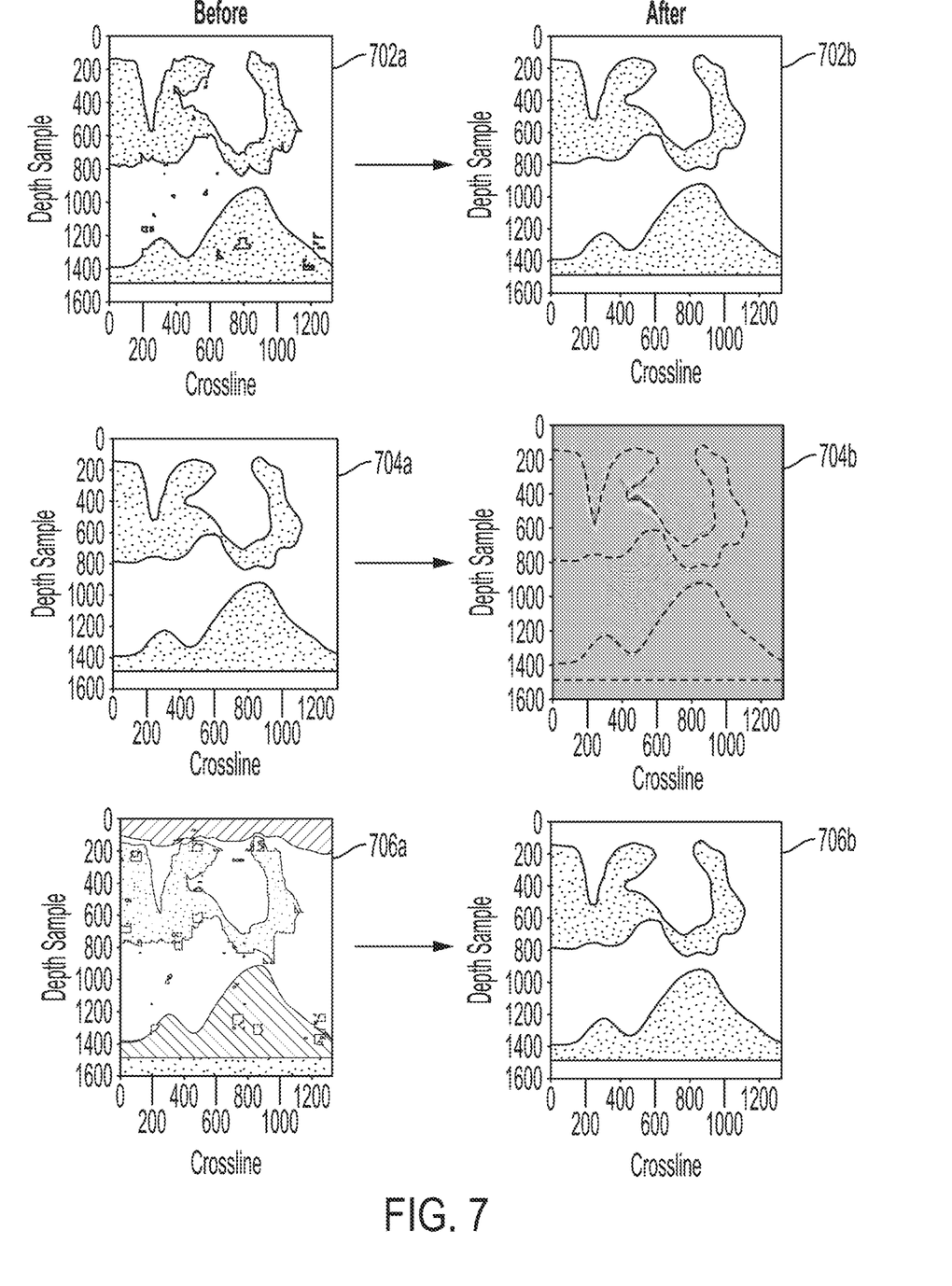
FIG. 7 depicts examples of processing operations according to some aspects.

Two approaches for highlighting the outer boundary of the target geological body are shown in FIG. 7, though other approaches are possible. One approach involves overlaying an outline of the outer boundary of the target geological body on the seismic data 220. This approach is represented in boxes 704a-b. Box 704a depicts an outer boundary of a salt body identified in the seismic data 220 by the processor 202. Box 704b depicts an outline of the salt body overlaid on the seismic data 220 by the processor 202, to highlight the outer boundary for the user. Another approach involves removing content external to the outer boundary of the target geological body from the seismic data 220. This approach is represented in boxes 706a-b. Box 706a depicts the seismic data 220, which includes a salt body in this example. Box 706b depicts the seismic data 220, where content external to the outer boundary of the salt body has been removed from the seismic data 220 by the processor 202. Removing such extraneous content can focus the user's attention on the target geological body (e.g., the salt body in FIG. 7).

In some examples, the one or more processing operations can additionally or alternatively include the actions described above with regard to FIG. 2. For example, the processor 202 can determine whether a target area of the subterranean formation is suitable for drilling a wellbore based on the output 216 from the trained machine-learning model 124. The computing device 122 can then generate a GUI indicating whether the target area is suitable for drilling and display the GUI on the display device 222. As another example, the processor 202 can generate a 3D simulation based on the seismic data 220 and the output 216 from the trained machine-learning model 124, execute the 3D simulation to determine simulated properties of the target area of the subterranean formation, and provide the simulated properties to a user (e.g., a well planner).

Hydrocarbon exploration and extraction can be facilitated according to one or more of the following examples.

EXAMPLE #1

A system of the present disclosure can include a processor and a memory including instructions that are executable by the processor. The instructions can be executable for causing the processor to receive seismic data indicating locations of a plurality of geological bodies in a target area of a subterranean formation. The instructions can be executable for causing the processor to provide the seismic data as input to a trained machine-learning model for determining whether the target area of the subterranean formation includes one or more types of geological bodies. The instructions can be executable for causing the processor to, in response to providing the seismic data as input to the trained machine-learning model, receive an output from the trained machine-learning model indicating that the target area of the subterranean formation includes the one or more types of geological bodies. The instructions can be executable for causing the processor to execute one or more processing operations for facilitating hydrocarbon exploration or extraction based on the seismic data and the output from the trained machine-learning model.

EXAMPLE #2

The system of Example #1 may feature the one or more types of geological bodies including a salt body, a water body, or a hydrocarbon body.

EXAMPLE #3

The system of any of Examples #1-2 may feature the one or more processing operations including: determining that a target type of geological body is present in the target area of the subterranean formation based on the output from the trained machine-learning model; executing an edge-detection algorithm on the seismic data to determine an outer boundary of the target type of geological body that is present in the target area; generating a graphical user interface that highlights the outer boundary relative to the seismic data; and displaying the graphical user interface on a display device.

EXAMPLE #4

The system of Example #3 may feature the graphical user interface including an outline of the outer boundary overtop of the seismic data to highlight the outer boundary; or the graphical user interface excluding seismic content external to the outer boundary from the seismic data to highlight the outer boundary.

EXAMPLE #5

The system of any of Examples #1-4 may feature the one or more processing operations including smoothing the seismic data by applying a median filter to the seismic data.

EXAMPLE #6

The system of any of Examples #1-5 may feature the memory further including instructions that are executable by the processor for causing the processor to generate a seismic-attribute dataset based on the seismic data. The seismic-attribute dataset can include a plurality of data point values for a particular type of seismic attribute. Each data point value in the plurality of data point values can be generated by applying one or more algorithms to a corresponding data point in the seismic data. The instructions may also be executable by the processor for causing the processor to provide the seismic-attribute dataset as input to the trained machine-learning model in addition to the seismic data. The seismic-attribute dataset can be used by the trained machine-learning model in conjunction with the seismic data for determining whether the target area of the subterranean formation includes the one or more types of geological bodies.

EXAMPLE #7

The system of Example #6 may feature the particular type of seismic attribute being a relative acoustic impedance, an apparent polarity, a reflection strength, a root mean squared frequency, or an arc length.

EXAMPLE #8

The system of any of Examples #1-7 may feature the memory further including instructions that are executable by the processor for causing the processor to, prior to receiving the seismic data: receive training data that includes a plurality of seismic datasets, where the training data can indicate which of the one or more types of geological bodies are present in each seismic dataset among the plurality of seismic datasets, and where the training data can exclude the seismic data; and train a machine-learning model using the training data to generate the trained machine-learning model.

EXAMPLE #9

The system of any of Examples #1-8 may feature the one or more processing operations including determining that the target area of the subterranean formation is suitable or unsuitable for drilling a wellbore by applying the output from the trained machine-learning model to a predefined set of rules; generating a graphical user interface indicating that the target area is suitable or unsuitable for drilling the wellbore, respectively; and displaying the graphical user interface on a display device.

EXAMPLE #10

The system of any of Examples #1-9 may feature the one or more processing operations including generating a three-dimensional simulation of the target area of the subterranean formation based on the seismic data and the output from the trained machine-learning model; executing the three-dimensional simulation to determine simulated properties of the target area of the subterranean formation; and providing the simulated properties to a well planner for use in a hydrocarbon exploration or extraction process.

EXAMPLE #11

A method of the present disclosure can include receiving seismic data indicating locations of a plurality of geological bodies in a target area of a subterranean formation; providing the seismic data as input to a trained machine-learning model for determining whether the target area of the subterranean formation includes one or more types of geological bodies; in response to providing the seismic data as input to the trained machine-learning model, receiving an output from the trained machine-learning model indicating that the target area of the subterranean formation includes the one or more types of geological bodies; and executing one or more processing operations for facilitating hydrocarbon exploration or extraction based on the seismic data and the output from the trained machine-learning model. Some or all of the method steps can be implemented by a processor.

EXAMPLE #12

The method of Example #11 may involve the one or more types of geological bodies including a salt body, a water body, or a hydrocarbon body.

EXAMPLE #13

The method of any of Examples #11-12 may involve the one or more processing operations including: determining that a target type of geological body is present in the target area of the subterranean formation based on the output from the trained machine-learning model; executing an edge-detection algorithm on the seismic data to determine an outer boundary of the target type of geological body that is present in the target area of the subterranean formation; generating a graphical user interface that highlights the outer boundary relative to the seismic data; and displaying the graphical user interface on a display device.

EXAMPLE #14

The method of Example #13 may involve the graphical user interface including an outline of the outer boundary overtop of the seismic data to highlight the outer boundary; or the graphical user interface excluding seismic content external to the outer boundary from the seismic data to highlight the outer boundary.

EXAMPLE #15

The method of any of Examples #11-14 may involve the one or more processing operations including smoothing the seismic data by applying a median filter to the seismic data.

EXAMPLE #16

The method of any of Examples #11-15 may involve generating a seismic-attribute dataset based on the seismic data. The seismic-attribute dataset can include a plurality of data point values for a particular type of seismic attribute. Each data point value in the plurality of data point values can be generated by applying one or more algorithms to a corresponding data point in the seismic data. The method may also involve providing the seismic-attribute dataset as input to the trained machine-learning model in addition to the seismic data. The seismic-attribute dataset can be used by the trained machine-learning model in conjunction with the seismic data for determining whether the target area of the subterranean formation includes the one or more types of geological bodies.

EXAMPLE #17

The method of Example #16 may involve the particular type of seismic attribute being a relative acoustic impedance, an apparent polarity, a reflection strength, a root mean squared frequency, or an arc length.

EXAMPLE #18

The method of any of Examples #11-17 may involve, prior to receiving the seismic data: receiving training data that includes a plurality of seismic datasets, where the training data can indicate which of the one or more types of geological bodies are present in each seismic dataset among the plurality of seismic datasets, and where the training data can exclude the seismic data; and training a machine-learning model using the training data to generate the trained machine-learning model.

EXAMPLE #19

The method of any of Examples #11-18 may involve the one or more processing operations including: determining that the target area of the subterranean formation is suitable or unsuitable for drilling a wellbore by applying the output from the trained machine-learning model to a predefined set of rules; generating a graphical user interface indicating that the target area is suitable or unsuitable for drilling the wellbore, respectively; and displaying the graphical user interface on a display device.

EXAMPLE #20

A non-transitory computer-readable medium of the present disclosure can include program code that is executable by a processor for causing the processor to: receive seismic data indicating locations of a plurality of geological bodies in a target area of a subterranean formation; provide the seismic data as input to a trained machine-learning model for determining whether the target area of the subterranean formation includes one or more types of geological bodies; in response to providing the seismic data as input to the trained machine-learning model, receive an output from the trained machine-learning model indicating that the target area of the subterranean formation includes the one or more types of geological bodies; and execute one or more processing operations for facilitating hydrocarbon exploration or extraction based on the seismic data and the output from the trained machine-learning model.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a seismic source configured to generate seismic waves;
a seismic sensor configurable to detect the seismic waves output from the seismic source and generate seismic data based on the seismic waves;
a processor; and
a memory including instructions that are executable by the processor for causing the processor to:
receive the seismic data generated by the seismic sensor, the seismic data indicating locations of a plurality of geological bodies in a target area of a subterranean formation, wherein the target area of the subterranean formation excludes a wellbore and the seismic data is usable for assessing whether the target area of the subterranean formation is suitable for drilling the wellbore;
generate a seismic-attribute dataset based on the seismic data;
provide the seismic data and the seismic-attribute dataset as input to a trained machine-learning model, the trained machine-learning model including a dense layer to provide one or more identifiers indicating one or more types of geological bodies that are present in the target area of the subterranean formation, wherein a location of a target type of geological body in the subterranean formation affects whether the target area of the subterranean formation is suitable for drilling the wellbore, and wherein the target type of geological body includes a salt body or a hydrocarbon body;
in response to providing the seismic data as input to the trained machine-learning model, receive an output from the trained machine-learning model indicating that the target area of the subterranean formation includes the target type of geological body; and
execute one or more processing operations for facilitating hydrocarbon exploration or extraction based on the output from the trained machine-learning model, wherein the one or more processing operations include:
determining that the target type of geological body is present in the target area of the subterranean formation based on the output from the trained machine-learning model;
executing an edge-detection algorithm on the seismic data to determine an outer boundary of the target type of geological body that is present in the target area;
generating a graphical user interface that highlights the outer boundary relative to the seismic data to assist a well planner in determining the location of the target type of geological body in the target area; and
displaying the graphical user interface on a display device for assisting the well planner in determining whether the target area is suitable for drilling.

2. The system of claim 1, wherein:
the graphical user interface includes an outline of the outer boundary overtop of the seismic data to highlight the outer boundary; or
the graphical user interface excludes seismic content external to the outer boundary from the seismic data to highlight the outer boundary.

3. The system of claim 1, wherein the one or more processing operations include smoothing the seismic data by applying a median filter to the seismic data.

4. The system of claim 1, wherein the seismic-attribute dataset includes a plurality of data point values for a particular type of seismic attribute, each data point value in the plurality of data point values being generated by applying one or more algorithms to a corresponding data point in the seismic data.

5. The system of claim 4, wherein the particular type of seismic attribute is a relative acoustic impedance, an apparent polarity, a reflection strength, a root mean squared frequency, or an arc length.

6. The system of claim 1, wherein the memory further includes instructions that are executable by the processor for causing the processor to, prior to receiving the seismic data:
receive training data that includes a plurality of seismic datasets, wherein the training data indicates which target type of geological body is present in each seismic dataset among the plurality of seismic datasets, and wherein the training data excludes the seismic data; and
train a machine-learning model using the training data to generate the trained machine-learning model.

7. The system of claim 1, wherein the one or more processing operations include:
determining that the target area of the subterranean formation is suitable or unsuitable for drilling the wellbore by applying the output from the trained machine-learning model to a predefined set of rules;
generating the graphical user interface to indicate that the target area is suitable or unsuitable for drilling the wellbore, respectively; and
displaying the graphical user interface on the display device.

8. The system of claim 1, wherein the one or more processing operations include:
generating a three-dimensional simulation of the target area of the subterranean formation based on the seismic data and the output from the trained machine-learning model;
executing the three-dimensional simulation to determine simulated properties of the target area of the subterranean formation; and
providing the simulated properties to the well planner for use in a hydrocarbon exploration or extraction process.

9. A method comprising:
receiving, by a processor, seismic data indicating locations of a plurality of geological bodies in a target area of a subterranean formation, wherein the seismic data is generated by one or more seismic sensors configured to detect seismic waves associated with the subterranean formation that are outputted by a seismic source;
generating, by the processor, a seismic-attribute dataset based on the seismic data;

providing, by the processor, the seismic data and the seismic-attribute dataset as input to a trained machine-learning model, the trained machine-learning model including a dense layer to provide one or more identifiers indicating one or more types of geological bodies that are present in the target area of the subterranean formation, wherein a location of a target type of geological body in the subterranean formation affects whether the target area of the subterranean formation is suitable for drilling a wellbore, and wherein the target type of geological body includes a salt body or a hydrocarbon body;

in response to providing the seismic data as input to the trained machine-learning model, receiving, by the processor, an output from the trained machine-learning model indicating that the target area of the subterranean formation includes the target type of geological body; and executing, by the processor, one or more processing operations for facilitating hydrocarbon exploration or extraction based on the output from the trained machine-learning model, wherein the one or more processing operations include:

determining that the target type of geological body is present in the target area of the subterranean formation based on the output from the trained machine-learning model;

executing an edge-detection algorithm on the seismic data to determine an outer boundary of the target type of geological body that is present in the target area of the subterranean formation;

generating a graphical user interface that highlights the outer boundary relative to the seismic data to assist a well planner in determining a location of the target type of geological body in the target area; and displaying the graphical user interface on a display device for assisting the well planner in determining whether the target area is suitable for drilling.

10. The method of claim 9, wherein:
the graphical user interface includes an outline of the outer boundary overtop of the seismic data to highlight the outer boundary; or
the graphical user interface excludes seismic content external to the outer boundary from the seismic data to highlight the outer boundary.

11. The method of claim 9, wherein the one or more processing operations include smoothing the seismic data by applying a median filter to the seismic data.

12. The method of claim 9, wherein the seismic-attribute dataset includes a plurality of data point values for a particular type of seismic attribute, each data point value in the plurality of data point values being generated by applying one or more algorithms to a corresponding data point in the seismic data.

13. The method of claim 12, wherein the particular type of seismic attribute is a relative acoustic impedance, an apparent polarity, a reflection strength, a root mean squared frequency, or an arc length.

14. The method of claim 9, further comprising, prior to receiving the seismic data:
receiving training data that includes a plurality of seismic datasets, wherein the training data indicates which of the target type of geological body is present in each seismic dataset among the plurality of seismic datasets, and wherein the training data excludes the seismic data; and training a machine-learning model using the training data to generate the trained machine-learning model.

15. The method of claim 9, wherein the one or more processing operations include:
determining that the target area of the subterranean formation is suitable or unsuitable for drilling a wellbore by applying the output from the trained machine-learning model to a predefined set of rules; and
generating the display device.

16. A non-transitory computer-readable medium comprising program code that is executable by a processor for causing the processor to:
receive seismic data indicating locations of a plurality of geological bodies in a target area of a subterranean formation, the seismic data being generated by one or more seismic sensors configured to detect seismic waves associated with the subterranean formation output by a seismic source;

generate a seismic-attribute dataset based on the seismic data;

provide the seismic data and the seismic-attribute dataset as input to a trained machine-learning model, the trained machine-learning model including a dense layer to provide one or more identifiers indicating one or more types of geological bodies that are present in the target area of the subterranean formation, wherein a location of a target type of geological body in the subterranean formation affects whether the target area of the subterranean formation is suitable for drilling a wellbore, and wherein the target type of geological body includes a salt body or a hydrocarbon body;

in response to providing the seismic data as input to the trained machine-learning model, receive an output from the trained machine-learning model indicating that the target area of the subterranean formation includes the target type of geological body; and execute one or more processing operations for facilitating hydrocarbon exploration or extraction based on the seismic data and the output from the trained machine-learning model, wherein the one or more processing operations include:

determining that the target type of geological body is present in the target area of the subterranean formation based on the output from the trained machine-learning model;

executing an edge-detection algorithm on the seismic data to determine an outer boundary of the target type of geological body that is present in the target area of the subterranean formation;

generating a graphical user interface that highlights the outer boundary relative to the seismic data to assist a well planner in determining a location of the target type of geological body in the target area; and displaying the graphical user interface on a display device for assisting the well planner in determining whether the target area is suitable for drilling.

17. The non-transitory computer-readable medium of claim 16, wherein:
the graphical user interface includes an outline of the outer boundary overtop of the seismic data to highlight the outer boundary; or
the graphical user interface excludes seismic content external to the outer boundary from the seismic data to highlight the outer boundary.

18. The non-transitory computer-readable medium of claim 16, wherein the one or more processing operations include smoothing the seismic data by applying a median filter to the seismic data.

19. The non-transitory computer-readable medium of claim 16, wherein the seismic-attribute dataset includes a plurality of data point values for a particular type of seismic attribute, each data point value in the plurality of data point values being generated by applying one or more algorithms to a corresponding data point in the seismic data.

20. The non-transitory computer-readable medium of claim 19, wherein the particular type of seismic attribute is a relative acoustic impedance, an apparent polarity, a reflection strength, a root mean squared frequency, or an arc length.

\* \* \* \* \*